United States Patent
Wildeman

(10) Patent No.: US 12,428,780 B2
(45) Date of Patent: Sep. 30, 2025

(54) ROOFING MATERIAL AND RELATED METHOD

(71) Applicant: TIETEX INTERNATIONAL LTD., Spartanburg, SC (US)

(72) Inventor: Martin Wildeman, Spartanburg, SC (US)

(73) Assignee: TIETEX INTERNATIONAL, LTD., Spartanburg, SC (US)

( * ) Notice: Subject to any disclaimer, the term of this patent is extended or adjusted under 35 U.S.C. 154(b) by 337 days.

(21) Appl. No.: 18/023,962

(22) PCT Filed: Aug. 31, 2021

(86) PCT No.: PCT/US2021/048469
§ 371 (c)(1),
(2) Date: Feb. 28, 2023

(87) PCT Pub. No.: WO2022/051285
PCT Pub. Date: Mar. 10, 2022

(65) Prior Publication Data
US 2023/0313449 A1    Oct. 5, 2023

Related U.S. Application Data

(60) Provisional application No. 63/073,563, filed on Sep. 2, 2020.

(51) Int. Cl.
| | |
|---|---|
| *D06N 5/00* | (2006.01) |
| *D04H 1/435* | (2012.01) |
| *D04H 1/4382* | (2012.01) |
| *D04H 1/52* | (2006.01) |
| *E04D 5/02* | (2006.01) |

(52) U.S. Cl.
CPC ............ *D06N 5/003* (2013.01); *D04H 1/435* (2013.01); *D04H 1/43828* (2020.05); *D04H 1/52* (2013.01); *E04D 5/02* (2013.01); *D06N 2201/02* (2013.01); *D06N 2201/10* (2013.01); *D06N 2209/10* (2013.01); *D10B 2401/063* (2013.01)

(58) Field of Classification Search
CPC .............. D06N 5/003; D06N 2209/10; D06N 2201/10; D06N 2201/02; D04H 1/43828; D04H 1/435; D04H 1/52; D04H 1/45; E04D 5/02; D10B 2401/063
See application file for complete search history.

(56) References Cited

U.S. PATENT DOCUMENTS

| | | | |
|---|---|---|---|
| 6,521,554 B1 * | 2/2003 | Wildeman | D04H 1/52 66/190 |
| 6,855,392 B2 | 2/2005 | Wildeman | |
| 10,112,365 B2 | 10/2018 | Van Der Zijpp et al. | |
| 2004/0161569 A1 * | 8/2004 | Zanchetta | E04D 5/10 428/40.1 |
| 2016/0250821 A1 * | 9/2016 | Van Der Zijpp | D06N 5/003 156/62.2 |
| 2021/0332591 A1 * | 10/2021 | Wenstrup | D06N 5/003 |

FOREIGN PATENT DOCUMENTS

| | | | | |
|---|---|---|---|---|
| DE | 102004022464 A1 * | 12/2005 | ............... | B32B 5/26 |
| EP | 3257989 B1 * | 3/2019 | ........... | D04B 21/165 |

OTHER PUBLICATIONS

English translation of EP-3257989-B1 to Hohmuth et al. obtained from Espacenet database (Year: 2019).*
English translation of DE-102004022464-A1 to Hunger et al. obtained from Espacenet database (Year: 2005).*

* cited by examiner

*Primary Examiner* — Jeremy R Pierce
(74) *Attorney, Agent, or Firm* — J.M. ROBERTSON, LLC

(57) ABSTRACT

A roofing material including a bitumen or other hot melt coating disposed across a base sheet of stitch-bonded fabric incorporating a blend of standard and bi-component polyester staple fibers stitch-bonded with a plurality of parallel stitch lines of stitching yarn running in the machine direction. The bicomponent fibers may be heat activated and cooled prior to application of the hot melt coating thereby providing dimensional stability.

6 Claims, No Drawings

ROOFING MATERIAL AND RELATED METHOD

CROSS-REFERENCE TO RELATED APPLICATION(S)

This application claims the benefit of, and priority from, U.S. provisional application 63/073,563 the contents of which are incorporated by reference in their entirety.

TECHNICAL FIELD

The present disclosure relates generally to roofing materials, and more particularly to a modified roofing material incorporating a textile with a bitumen or other hot melt layer coated on one or both faces of the base sheet. Mineral granules or powder such as fine gravel, sand or talcum may be optionally deposited on the surface of the bitumen layer. Such roofing materials may find use in covering large area flat roofs by localized heat activation and adhesion in a manner as will be well known to those of skill in the art.

BACKGROUND

It is well known to form roofing materials using a base sheet of glass-reinforced fleece coated with molten bitumen on one or both faces thereof to form surface layer(s) of bitumen of a suitable thickness. In typical prior constructions, the base sheet is formed by needle-punching a bed of relatively short polyester staple fibers having a length of about 1-4 inches using a bed of barbed needles to entangle the fibers and form a cohesive felt structure. During the needle-punching operation, extended length fiberglass strands are introduced in the machine direction for incorporation within the felt. The glass strands are held in place within the felt structure by the surrounding entangled staple fibers but remain substantially in the machine direction orientation as introduced.

According to the typical prior practice, after the base sheet is formed, a pad finish is applied to promote dimensional stability. The base sheet with the applied finish is then delivered to a hot melt coating line where molten bitumen is applied at a temperature of about 180 degrees C. During the bitumen application process the base sheet is under tension as it is transported through the coating line. The fiberglass strands act to carry the applied tension load and substantially prevent the base sheet from necking down (i.e. contracting in the width dimension). The desired width dimension in the roofing material is thereby maintained To suppress the adhesion of the applied bitumen at room temperature, mineral granules or powder such as fine gravel, sand or talc may be deposited on the bitumen-coated surface. Alternatively, a thin film of synthetic polymer or metal foil may be adhered to the bitumen-coated surface layer. The base sheet with applied bitumen may then be cooled to ambient temperature by use of rotating cooling drums or the like to solidify the bitumen. The resulting finished product may then be stored and handled in the form of rolls or sheets. The applied surface treatments are useful for preventing the bitumen surface layers from sticking to each other during storage and handling.

In a typical roofing operation, bitumen is heated up to a temperature of approximately 200 C or more and is coated or poured onto a surface to be covered. Then, the pre-formed roofing material may be spread over the applied bitumen while the surface is still hot such that the bitumen layer on the roofing material adheres to the hot bitumen on the surface being covered. If desired, this process may be repeated multiple times to build up a protective surface covering of desired water-proof character.

While the prior materials and practices may provide acceptable functionality, the need to apply fiberglass strands and a pad finish to the base sheet adds substantial complexity and cost to process. Accordingly, a bitumen coated roofing material incorporating a base sheet which does not require fiberglass strands and/or a pad finish for adequate dimensional stability would represent a useful advancement over the prior art.

SUMMARY OF THE DISCLOSURE

In accordance with one exemplary aspect, the present disclosure provides advantages and alternatives over the prior art by providing a roofing material including a bitumen or other hot melt coating disposed across a base sheet of stitch-bonded fabric incorporating a blend of standard and bi-component polyester staple fibers stitch-bonded with a plurality of parallel stitch lines of stitching yarn running in the machine direction. The bicomponent fibers may be heat activated and cooled prior to application of the bitumen coating to form fusion junctions with the standard polyester staple fibers thereby providing dimensional stability without requiring a pad finish. The total percentage of low melting point polyester in the finished fabric (from the sheath of the bicomponent fiber) may range from about 5% to about 80% and will most preferably be about 15% to 60% although higher and low percentages may be used if desired. The stitch lines provide the load-carrying function of the prior fiberglass strands. At the same time, the base sheet retains a degree of stretch in both directions. This stretching capacity aids in processing.

Other exemplary aspects and features of the disclosure will become apparent upon review of the following detailed description of preferred embodiments and practices.

DESCRIPTION

The present disclosure may be best understood through reference to the following non-limiting examples.

Example 1

A single bar stitch-bonded base sheet for a bitumen-coated roofing material was formed having the following construction:

| T19 | Unfinished | Heat Set |
| --- | --- | --- |
| Gauge (wales per inch) | 7 | 5.8 |
| Courses Per Inch | 8.2 | 7.8 |
| Stitch Density (wpi x cpi) | 57.4 | 45.2 |
| Fabric Fiber Composition | 100% Polyester | 100% Polyester |
| Stitching Yarn | 300 Denier, 72 Filament Polyester | 300 denier, 72 filament polyester |

-continued

| T19 | Unfinished | Heat Set |
|---|---|---|
| Stitching Fleece | 65% Polyester; 35% Core/Sheath Bicomponent Polyester; Polyester-3 dpf, 3 Inch Staple | 65% Polyester; 35% Core/Sheath Bicomponent Polyester; Polyester-3 dpf, 3 Inch Staple |
| Total Percentage Bicomponent In Fabric | 28.9% | 28.9% |
| Fabric Basis Weight (grams per square meter) | 178 | 144 |
| Stitch Notation | 1-0/1-0 Chain Stitch | 1-0/1-0 Chain Stitch |
| Tensile Strength (lbs per inch), Machine Direction | — | 98.0 |
| Tensile Strength (lbs per inch), Cross Direction | — | 84.2 |
| Cold Elongation, MD % | — | 23.0 |
| Cold Elongation, CD % | — | 21.2 |
| 180° C. Hot Elongation (MD), 5kg load, % | — | 3.1 |
| 180° C. Hot Elongation (MD), 8daN load, % | — | 6.7 |

Example 2

A single bar stitch-bonded base sheet for a bitumen-coated roofing material was formed having the following construction:

| T10 | Unfinished | Heat Set |
|---|---|---|
| Gauge (wales per inch) | 7 | 5.8 |
| Courses Per Inch | 8.2 | 7.8 |
| Stitch Density (wpi × cpi) | 57.4 | 45.2 |
| Fabric Fiber Composition | 100% Polyester | 100% Polyester |
| Stitching Yarn | 300 Denier, 72 Filament Polyester | 300 denier, 72 filament polyester |
| Stitching Fleece | 50% Polyester; 50% Core/Sheath Bicomponent Polyester; Polyester-6 dpf, 3 Inch Staple | 50% Polyester; 50% Core/Sheath Bicomponent Polyester; Polyester-6 dpf, 3 Inch Staple |
| Total Percentage Bicomponent In Fabric | 41.3% | 41.3% |
| Fabric Basis Weight (grams per square meter) | 177 | 143 |
| Stitch Notation | 1-0/1-0 Chain Stitch | 1-0/1-0 Chain Stitch |
| Tensile Strength (lbs per inch), Machine Direction | — | 112.3 |
| Tensile Strength (lbs per inch), Cross Direction | — | 82.8 |
| Cold Elongation, MD % | — | 21.6 |
| Cold Elongation, CD % | — | 23.3 |
| 180°C Hot Elongation (MD), 5kg load, % | — | 0.9 |
| 180° C. Hot Elongation (MD), 8daN load, % | — | 4.9 |

Example 3

A single bar stitch-bonded base sheet for a bitumen-coated roofing material was formed having the following construction:

| T12 | Unfinished | Heat Set |
|---|---|---|
| Gauge (wales per inch) | 7 | 5.8 |
| Courses Per Inch | 18 | 17.9 |
| Stitch Density (wpi × cpi) | 126 | 103.8 |
| Fabric Fiber Composition | 100% Polyester | 100% Polyester |
| Stitching Yarn | 300 Denier, 72 Filament Polyester | 300 denier, 72 filament polyester |

| T12 | Unfinished | Heat Set |
|---|---|---|
| Stitching Fleece | 50% Polyester; 50% Core/Sheath Bicomponent Polyester; Polyester-6 dpf, 3 Inch Staple | 50% Polyester; 50% Core/Sheath Bicomponent Polyester; Polyester-6 dpf, 3 Inch Staple |
| Total Percentage Bicomponent In Fabric | 40.5% | 40.5% |
| Fabric Basis Weight (grams per square meter) | 177 | 160 |
| Stitch Notation | 1-0/1-0 Chain Stitch | 1-0/1-0 Chain Stitch |
| Tensile Strength (lbs per inch), Machine Direction | — | 120.7 |
| Tensile Strength (lbs per inch), Cross Direction | — | 76.4 |
| Cold Elongation, MD % | — | 29.6 |
| Cold Elongation, CD % | — | 22.3 |
| 180° C. Hot Elongation (MD), 5kg load, % | — | 1.8 |
| 180° C. Hot Elongation (MD), 8daN load, % | — | 8.3 |

Example 4

A single bar stitch-bonded base sheet for a bitumen-coated roofing material was formed having the following construction:

| T16 | Unfinished | Heat Set |
|---|---|---|
| Gauge (wales per inch) | 7 | 5.8 |
| Courses Per Inch | 8.2 | 8.2 |
| Stitch Density (wpi × cpi) | 57.4 | 47.6 |
| Fabric Fiber Composition | 100% Polyester | 100% Polyester |
| Stitching Yarn | 300 Denier, 72 Filament Polyester | 300 denier, 72 filament polyester |
| Stitching Fleece | 50% Polyester; 50% Core/Sheath Bicomponent Polyester; Polyester-6 dpf, 3 Inch Staple | 50% Polyester; 50% Core/Sheath Bicomponent Polyester; Polyester-6 dpf, 3 Inch Staple |
| Total Percentage Bicomponent In Fabric | 43.2% | 43.2% |
| Fabric Basis Weight (grams per square meter) | 228 | 213 |
| Stitch Notation | 1-0/1-0 Chain Stitch | 1-0/1-0 Chain Stitch |
| Tensile Strength (lbs per inch), Machine Direction | — | 127.3 |
| Tensile Strength (lbs per inch), Cross Direction | — | 128.3 |
| Cold Elongation, MD % | — | 25.2 |
| Cold Elongation, CD % | — | 20.6 |
| 180° C. Hot Elongation (MD), 5kg load, % | — | 1.8 |
| 180° C. Hot Elongation (MD), 8daN load, % | — | 6.7 |

Example 5

A single bar stitch-bonded base sheet for a bitumen-coated roofing material was formed having the following construction:

| T1 | Unfinished | Heat Set |
|---|---|---|
| Gauge (wales per inch) | 7 | 5.8 |
| Courses Per Inch | 8.2 | 8.2 |
| Stitch Density (wpi × cpi) | 57.4 | 47.6 |
| Fabric Fiber Composition | 100% Polyester | 100% Polyester |
| Stitching Yarn | 300 Denier, 72 Filament Polyester | 300 denier, 72 filament polyester |
| Stitching Fleece | 75% Polyester; 25% Core/Sheath | 75% Polyester; 25% Core/Sheath |

-continued

| T1 | Unfinished | Heat Set |
|---|---|---|
| | Bicomponent Polyester; Polyester-6 dpf, 3 Inch Staple | Bicomponent Polyester; Polyester-6 dpf, 3 Inch Staple |
| Total Percentage Bicomponent In Fabric | 20.3% | 20.3% |
| Fabric Basis Weight (grams per square meter) | 167 | 143 |
| Stitch Notation | 1-0/1-0 Chain Stitch | 1-0/1-0 Chain Stitch |
| Tensile Strength (lbs per inch), Machine Direction | — | 85.4 |
| Tensile Strength (lbs per inch), Cross Direction | — | 68.3 |
| Cold Elongation, MD % | — | 23 |
| Cold Elongation, CD % | — | 71.8 |
| 180° C. Hot Elongation (MD), 5kg load, % | — | 3.5 |
| 180° C. Hot Elongation (MD), 8daN load, % | — | 7.1 |

Example 6

A single bar stitch-bonded base sheet for a bitumen-coated roofing material was formed having the following construction:

| 3559T1 | Unfinished | Heat Set |
|---|---|---|
| Gauge (wales per inch) | 7 | 6.7 |
| Courses Per Inch | 8.2 | 8.2 |
| Stitch Density (wpi x cpi) | 57.4 | 55.0 |
| Fabric Fiber Composition | 100% Polyester | 100% Polyester |
| Stitching Yarn | 300 Denier, 72 Filament Polyester | 300 denier, 72 filament polyester |
| Stitching Fleece | 75% Polyester; 25% Core/Sheath Bicomponent Polyester; Polyester-6 dpf, 3 Inch Staple | 75% Polyester; 25% Core/Sheath Bicomponent Polyester; Polyester-6 dpf, 3 Inch Staple |
| Total Percentage Bicomponent In Fabric | 19.6% | 19.6% |
| Fabric Basis Weight (grams per square meter) | 145 | 132 |
| Stitch Notation | 1-0/1-0 Chain Stitch | 1-0/1-0 Chain Stitch |
| Tensile Strength (lbs per inch), Machine Direction | — | 87.9 |
| Tensile Strength (lbs per inch), Cross Direction | — | 59.7 |
| Cold Elongation, MD % | — | 23.3 |
| Cold Elongation, CD % | — | 62.9 |
| 180° C. Hot Elongation (MD), 5kg load, % | — | 2.7 |
| 180° C. Hot Elongation (MD), 8daN load, % | — | 5.6 |

Each of these base sheets is adapted for coating with molten bitumen on one or both sides for subsequent cooling and use as a roofing material in accordance with standard roofing practices. As can be seen, in each of these examples the hot elongation in the machine direction at 8 daN (decaNewtons) is less than 9% and may be less than 5%. The tensile strength in the machine direction is not less than 85 pounds force per inch. The tensile strength in the cross-machine direction is not less than 59 pounds force per inch.

The use of the terms "a" and "an" and "the" and similar referents in the context of describing the disclosure are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A roofing material comprising a hot melt coating disposed across a base sheet of stitch-bonded fabric, the stitch-bonded fabric comprising a fleece substrate with a plurality of parallel stitch lines of stitching yarn stitched through the fleece substrate, the stitch lines running in the machine direction, the fleece substrate including a blend of polyester staple fibers in combination with bi-component polyester fibers, wherein the bi-component polyester fibers include a first polyester component having a first melting point and at least a second polyester component having a second melting point which is lower than the first melting point and lower than the melting point of the polyester staple fibers, and wherein at least a portion of the bi-component polyester fibers are heat fused to polyester staple fibers by the second polyester component at fusion junctions within the fleece substrate and wherein the stitch-bonded fabric has a tensile strength to failure in the machine direction of not less than 85 pounds force per inch and a tensile strength to failure in the cross-machine direction of not less than 59 pounds force per inch.

2. The roofing material as recited in claim 1, wherein the hot melt coating is bitumen.

3. The roofing material as recited in claim 1, wherein the bi-component polyester fibers comprise a core of the first polyester component at least partially surrounded by a sheath of the second polyester component.

4. The roofing material as recited in claim 1, wherein the stitch-bonded fabric has a hot elongation in the machine direction at 8 daN (decaNewtons) of less than 9%.

5. The roofing material as recited in claim 1, wherein the stitch-bonded fabric has a hot elongation in the machine direction at 8 daN (decaNewtons) of less than 5%.

6. The roofing material as recited in claim 1, wherein the base sheet of stitch-bonded fabric is free from applied pad finishes.

* * * * *